United States Patent [19]

Koehl et al.

[11] Patent Number: 4,491,421
[45] Date of Patent: Jan. 1, 1985

[54] IMPELLER ASSEMBLY AND SHAFT HAVING INTERFERENCE FIT

[75] Inventors: Richard Koehl, Niederbronn les Bains, France; Michael J. Lerman, Edison, N.J.

[73] Assignee: De Dietrich (USA), Inc., Union, N.J.

[21] Appl. No.: 552,991

[22] Filed: Nov. 21, 1983

[51] Int. Cl.³ .............................. B01F 7/18; B01F 7/22
[52] U.S. Cl. ................................ 366/247; 29/156.8 R; 29/525; 366/325; 366/327; 366/330
[58] Field of Search ............... 366/343, 344, 349, 325, 366/330, 331, 247, 245, 326, 327, 328, 329; 29/156.8 R, 156.8 CF, 525, 458; 416/241 B

[56] References Cited

U.S. PATENT DOCUMENTS

| | | |
|---|---|---|
| 2,811,339 | 10/1957 | Osborne et al. |
| 3,494,708 | 2/1970 | Nunlist et al. ................ 366/326 |
| 3,526,467 | 9/1970 | Kime ............................ 416/200 |
| 3,809,495 | 5/1974 | Stahl ........................... 416/241 B |
| 3,917,235 | 11/1975 | Deve ............................ 366/330 |
| 4,067,662 | 1/1978 | Rossmann ................... 416/231 R |
| 4,142,836 | 3/1979 | Glenn .......................... 416/212 A |
| 4,221,488 | 9/1980 | Nunlist et al. |

*Primary Examiner*—Robert W. Jenkins
*Attorney, Agent, or Firm*—Pennie & Edmonds

[57] ABSTRACT

A shaft and an impeller assembly formed by individual blade members are connected together in an interference fitted connection. Both the shaft and impeller assembly are coated with a corrosion resistant material and the connection is created between the coated surfaces.

26 Claims, 7 Drawing Figures

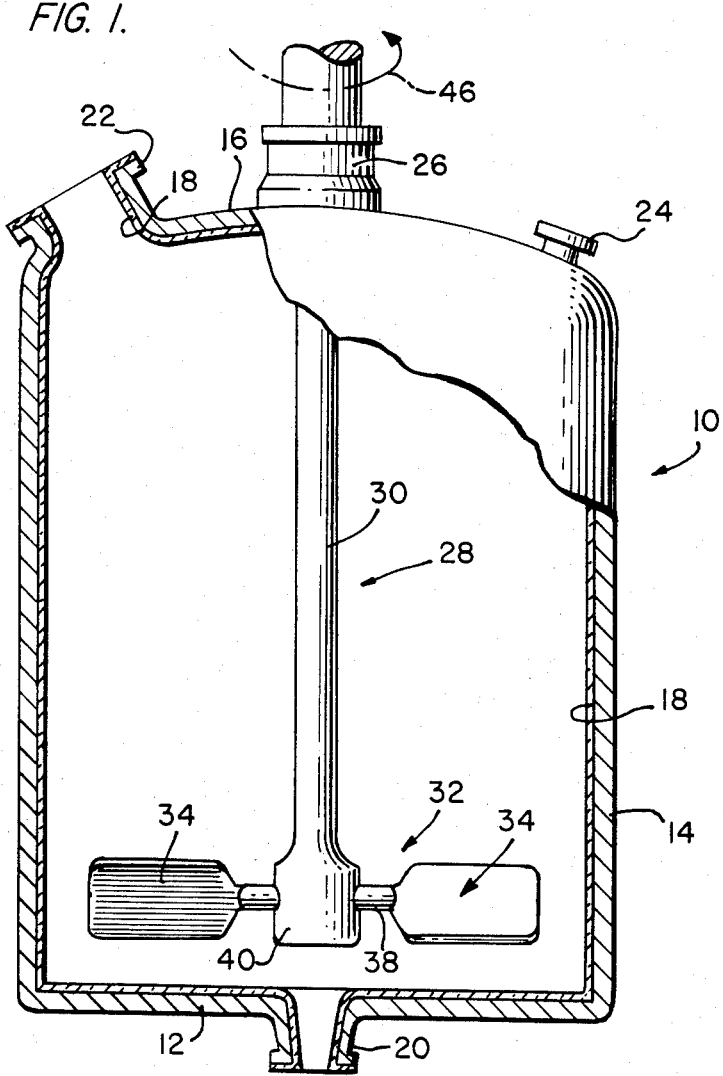
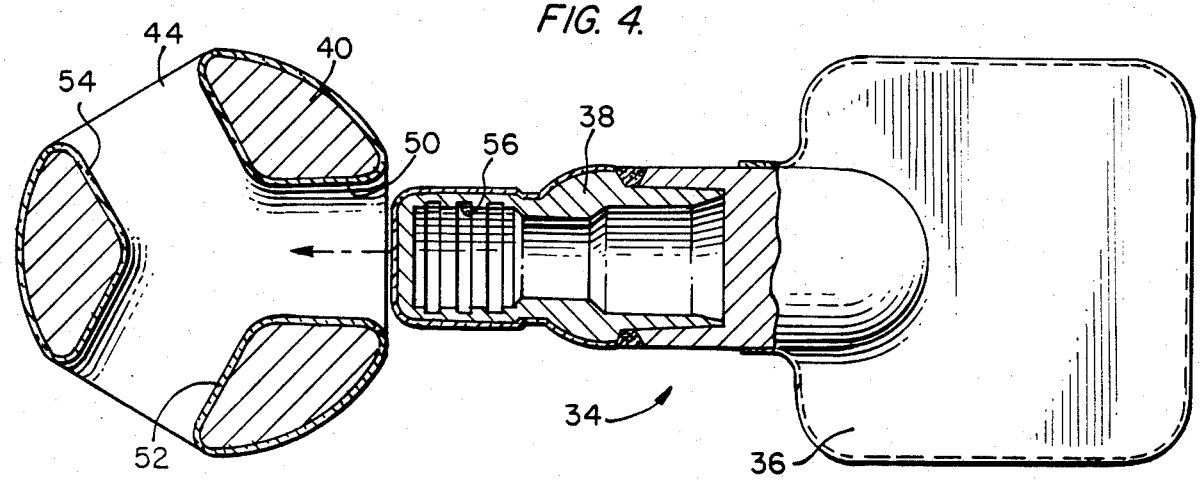

IMPELLER ASSEMBLY AND SHAFT HAVING INTERFERENCE FIT

DESCRIPTION

1. Technical Field

The invention relates to structure in the form of an agitator having an impeller assembly mounted and retained on a shaft by an interference fit. The impeller assembly and shaft are capable of being assembled within a vessel, and both the impeller assembly and the length of shaft within the vessel, throughout their entire surface, are coated with a material inert to the materials which may be reacted within the vessel. The interference fit is obtained between coated surfaces.

2. Background Art

An impeller assembly for mounting on a shaft, and having use in conjunction with a vessel for mixing reactants is known to the prior art. It is also known to coat the substructure of the impeller assembly and shaft which will be in contact with the material, with a coating of an inert substance, such as a vitreous enamel or glass, for example, thereby to protect the substructure from damage through corrosive or other damaging action caused by the reactants. Further, it is known that the impeller assembly and shaft may be mounted together with the vessel and retained in a mounted orientation by an interference fit between coated surfaces.

Typical of the prior art of this type are U.S. Pat. Nos. 2,811,339 to A. V. Osborne et al, 3,494,708 to E. J. Nunlist et al and 4,221,488 to E. J. Nunlist et al.

Osborne et al and both Nunlist et al patents describe a structure coated with a coating either of vitreous enamel or glass for purposes of protection of the substructure from attack through contact with corrosive materials or other materials within the vessel which may deleteriously attack that substructure. The Osborne et al patent and the Nunlist et al '708 patent describe a manner and means which may generally be considered as a mechanical compression fit in mounting the impeller assembly on the shaft. These patents, and U.S. Pat. No. 3,526,467 to D. L. Kime, also disclose the impeller assembly which comprises a plurality of tiers of structure, each of which supports at least one outward extending blade. In Osborne et al, Nunlist et al '708 and Kime the tiers of support are closely adjacent, and in both Osborne et al and Nunlist et al '708 the mechanical compression fit is developed between the shaft and the tiers of support structure.

The second Nunlist et al '488 patent discloses a separable blade agitator, described by the patentees as an improvement over the structures described in the Osborne et al and Nunlist et al '708 patents. This improvement is in the manner of mounting an impeller assembly on a shaft. The improvement is in an interference fit between structures created by first contracting the shaft by contact with a cryogenic coolant, and then, allowing the shaft to expand within a bore of a hub of the impeller assembly as the temperature of the shaft returns to ambient temperature conditions. The impeller assembly includes a unitary hub structure supporting a plurality of blades which extend outwardly in pairs of spaced (radially) blades.

While the Nunlist et al '488 patent may improve upon techniques for mounting an impeller assembly on a shaft, it is considered that the Nunlist et al '488 patent teaching still suffers from certain disadvantages. Possibly the foremost of these disadvantages is founded upon the requirement of replacement of the entire impeller assembly in the event that one or more blades, or the hub of the impeller assembly supporting the blades, is damaged during operation. Damage may be in the form of a chip or crack in the inert coating material thereby to expose the substructure to attack and damage through contact with reactant material in the vessel. A further disadvantage is that the interference fit must assure an adequate transmission of torque between the shaft and the impeller assembly. In addition, the impeller assembly may be somewhat difficult to handle within the vessel. This consideration is based upon the nature of the construction and that the blades extend rigidly from the hub. Further, the hub adds unnecessarily to the overall size and weight of the impeller assembly structure.

SUMMARY OF THE INVENTION

This invention is considered an improvement over the Nunlist et al '488 patent at least in the manner of mounting an impeller assembly on a shaft. More particularly, the impeller assembly which is formed by one or more blade members in each of a single or multiple tiers of blade members are mounted individually within a region of the shaft extending from the distal end, located in the vessel. The blade members are supported by the shaft by an interference fit between the surface of the arm of the blade member and the surface of a bore complementary to that of the arm which extends toward the longitudinal axis of the shaft. In the first form of the invention, the interference fit is created by a force fit of the arm into the bore, and in the second form of the invention the interference fit is created by allowing the arm of the blade member, which first was coated and shrunk, to expand into surface contact with the surface of the bore.

Both forms of the invention are considered to provide significant advantages over the prior art. One advantage relates to the capability of replacement of single blade members of the impeller assembly, while a second advantage concerns the interference fit to be achieved between surfaces of the arm of a blade member and bore of the shaft. To this end, interference fit need only retain the blade member within the bore of the shaft during rotation in opposition to the centrifugal force created by the shaft rotation, which acts to dislodge the blade member, and to resist rotation of the arm of a blade member in its respective shaft bore against the rotational moment around the axis of said blade member as may be developed by unbalanced forces acting on the blade member during rotation. An attendant advantage of the invention derives from the construction of each blade member and its manner of mounting which reduces the weight of the assembly which must be handled within the vessel during replacement of a damaged assembly.

Other areas of improvement and advantages over the prior art will be explored and will become evident as the description continues.

Several forms of an impeller assembly and shaft will be discussed. In each form, the impeller assembly and shaft, including each bore, are completely coated with a coating of an inert material to protect the substructure from possible deleterious contact with reactants in the vessel. In each form of impeller assembly, whether it includes a single or multiple blade members mounted on the shaft in a single tier or in multiple tiers of blade members, the blade member is retained on the shaft by an interference fit created between the coated surfaces. The accurate surfacing of these coated surfaces may be accomplished by any suitable means, such as grinding, honing or lapping. According to the first form of the invention, an axial force exerted on a blade member of the impeller assembly in the direction of the longitudinal axis of the shaft will result in relative movement between the blade member and shaft to create an interference fit therebetween. The second form of the invention resides in the expansion fit.

Whereas in the prior art a good interference fit is required to transmit the required torque through a longitudinal joint from the shaft to the impeller assembly without slippage between the mating components, the components of the invention require an interference fit of sufficient strength to prevent the blade member from flying from the shaft as the centrifugal force and other forces which act upon the blade member increase as the speed of rotation of the shaft increases. The rotational moment and the application of torque about the axis of the blade member to rotate the blade member is considered to be slight and in any event the strength of the interference fit need not even approach the level as may be required to resist relative rotation of an axially supported impeller of the construction of the prior art. Thus, not only is the interference fit more easily attainable, it provides a resistance to disengagement many times greater than the force or forces which could develop through operation. For the first form of the invention, the assembly force is low and may be accomplished with a simple bracket means, such as plates with threaded rods, by tightening the rods. Disengagement of a blade member from the shaft is likewise easily accomplished by exerting a sufficient force axial to the blade member in a direction away from the longitudinal axis of the shaft. Disengagement of a blade member of the second form of the invention, which has been expanded into interference fit will require that the arm be cooled, and shrunk, once again. It is contemplated that a hole be drilled or otherwise formed in the arm, so that a coolant may be received into an interior cavity.

In a basic form of the invention, the impeller assembly comprises one or more blade members arranged in a tier extending from the shaft in a direction substantially along a radius of the axis of the shaft which supports the impeller assembly. The shaft includes a region extending from the end received in the vessel and a series of bores within the region equal in number to the number of blade members in the tier. There may be as many as six blade members, and preferably three blade members at equidistant angular spacing around the shaft. Each blade member is formed by a blade portion and an arm including a cylindrical surface extending from the blade portion. The bore has a surface to complement the surface of the arm. The shaft and impeller assembly are coated throughout with a continuous coating of an inert substance, and an interference fit is developed between the coated surfaces when the arm is located in a respective bore.

Other forms or modifications of the invention are characterized by assemblies including individual spaced tiers of blade members wherein the blade members in each tier may be of equal number, or of different number, they may be of one type in one tier and of a different type in another tier, such as flat, curved, and of airfoil configuration, and so forth. While there are many possible permutations, preferably the blade member of a tier will be spaced axially from the blade members of another tier by a distance at least equal to the span of blade members, and if the blade members are pitched at an angle such as 45°, preferably all the blade members are similarly pitched so as not to provide counteraction.

These features and advantages of the invention will become clear and other features and advantages of the invention will be apparent as the description, to be read in conjunction with a view of the drawing, continues.

BRIEF DESCRIPTION OF THE DRAWING

FIG. 1 is a view in elevation, partly broken away and partly in section, of a vessel with an impeller assembly and a shaft;

FIG. 4 is an enlarged view of the shaft in section, and the manner of support of a blade member by the shaft.

BEST MODE FOR CARRYING OUT THE INVENTION

Figure 2:
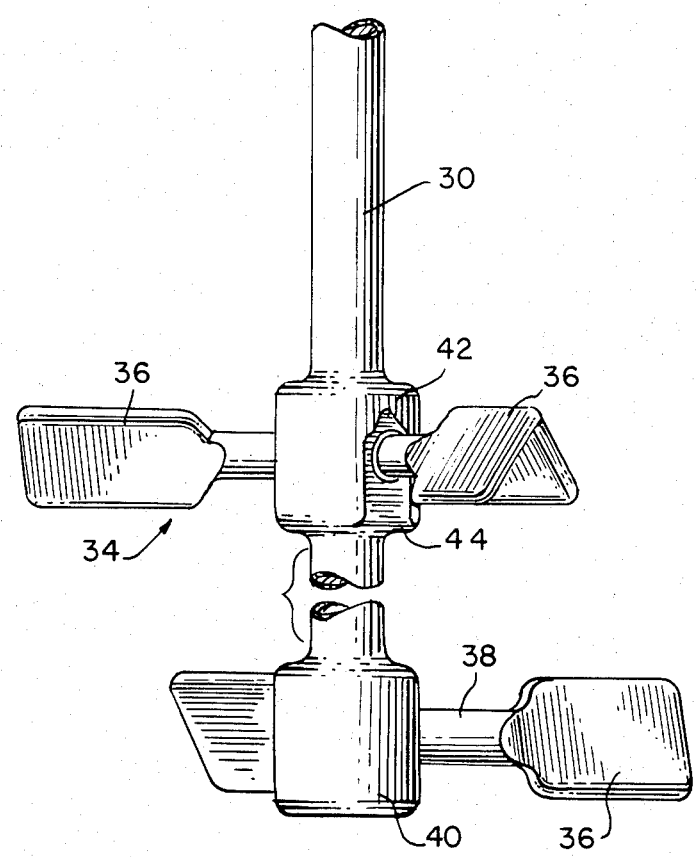
FIG. 2 is a view of a length of the shaft from the distal end illustrating a form of impeller assembly including two tiers of blade members.

Referring to FIG. 1, a vessel 10 which may be a reactor of the type used in the chemical industry is illustrated schematically for the purpose of providing an environmental showing of the invention. These vessels oftentimes are quite large, and during processing of material it is not an uncommon occurrence that high pressures or vacuum develop within the confines of the vessel itself. Vessels of the type described above may be formed generally by a base 12, a wall 14 which extends from the base toward a top 16 which enclosed the vessel.

The nature of the use of vessel 10 requires a coating for the surfaces of the substructure of the base, wall and top toward the interior of the vessel. The coating 18 preferably is in the form of a continuous layer of a material inert to the materials which may be subject to processing within the vessel. Typical coating materials are vitreous enamel and glass. By providing a continuous coating, for example, a coating of glass, these processed materials or their reaction products normally will be incapable of attacking the substructure of the vessel itself. This substructure, then, may be formed of substantially any material which shall display the necessary strength and operative specifications for use as a vessel. The glass layer may be in the range of thickness of about 0.030 to 0.100 in.

Since the vessel oftentimes is subject to conditions of pressure it has been found desirable to limit the number of openings into the interior of the vessel. To this end, a port 20 may be located in the base 12, and openings in top 16 preferably are limited to a manway 22 and a plurality of nozzles 24. The nozzles compared to the manway are relatively small and provide access to the vessel for the introduction of process streams. An opening 26 is located axially of the vessel and allows passage of the shaft of an agitator used in stirring, mixing or otherwise processing the material. Structure (not shown) for supporting the shaft is mounted on top 16 above opening 26 and structure (also not shown) in the form of a shaft closure provides a seal within the annular opening between the shaft and opening 26. A cover (not shown) will close the manway.

Agitators of multipiece construction are particularly useful in vessels such as the type of vessel described because these structures permit assembly within the vessel and the elimination of a large opening or manway which is usually provided for the installation and removal of agitators of one-piece construction.

The apparatus for use in stirring, mixing or otherwise processing material may be characterized as a separable blade agitator 28 including a shaft 30 and an impeller assembly 32 carried by the shaft. These components of the separable blade assembly are illustrated only generally in FIG. 1.

The impeller assembly 32 is formed by one or more blade members 34 which may be arranged in a single tier of blade members, see FIG. 1 or in two or more tiers of blade members, see FIG. 2. Different types of action in the processing of materials may suggest that the impeller assembly comprise blade members of different form or arrangement to carry out different processing operations, as well as to suggest that the impeller assembly include one tier of blade members as opposed to multiple tiers of blade members. Normally the blade members in each tier will be of like outline and similarly oriented with respect to the axis of shaft 30. Normally, also, the blade members of the several tiers will be of like outline and similarly oriented so as to provide a tandem action between blades.

Figure 5:
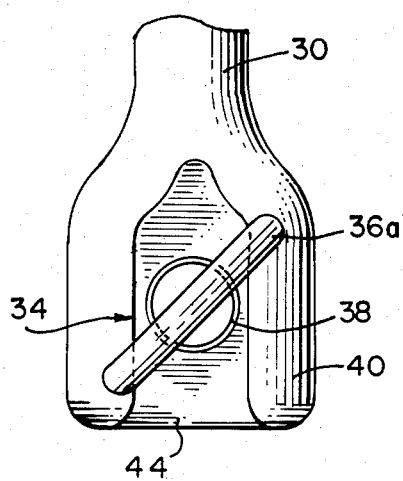
FIGS. 5, 6 and 7 are elevational views of representative shapes of blade members, only a single blade member is shown so not to clutter the illustration, supported by the shaft.
Figure 6:
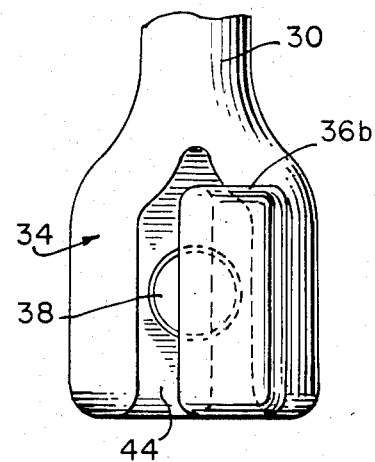
Figure 7:
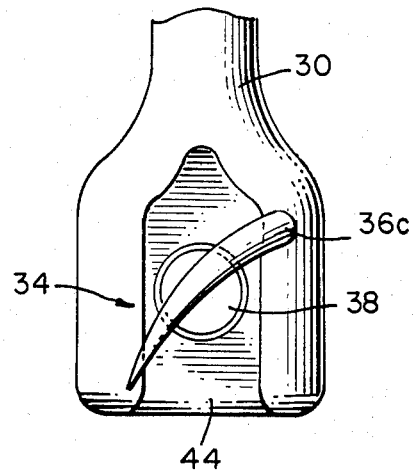

Each blade member 34 includes a blade portion 36 and an arm 38 which extends from and axially of the blade portion. Several possible outlines of blade portions, as seen in FIGS. 5–7, will be discussed below.

The blade member 34, without any attempt to limit the invention, but rather to describe a particularly preferred construction of blade member, may be about 16½ in. (about 410 mm) in axial length. The blade portion 36 may be substantially square having a side dimension of about 8 in. (about 203 mm) and a thickness of about 1⅛ in. (about 28 mm). The arm 38 is cylindrical throughout, having a first diameter at the blade portion of about 3½ in. (about 89 mm). The arm merges into the blade portion with a compound curve and extends throughout a length toward the distal end in a surface of somewhat reduced diameter. This diameter may be about 2¾ in. (about 70 mm). The blade member in the first form of the invention may be either of a solid or hollow substructure, and in the second form of the invention, is of hollow substructure, which preferably are formed of a metal having a required measure of strength, and one which is relatively light in weight.

As may be seen principally in FIGS. 1 and 2, shaft 30 is elongated in outline and includes an enlarged bulbous region at the distal end to locate the impeller assembly supported on the shaft near base 12.

The purpose of the enlarged region is to enlarge only a portion of the length of the shaft for one or more blade members of an impeller assembly comprising a single tier of blade members. As such, the weight of the shaft may be kept to a minimum. FIG. 1 illustrates a single region 40 whereas FIG. 2 illustrates a second region, or subregion 42, spaced from the single region or subregion 40. While not shown explicitly, the two subregions and the intermediate length of shaft may be welded together.

There may be instances that the impeller assembly will include more than two subregions for support of more than two tiers of blade members. Each subregion and length of shaft will be similarly connected. The number of tiers of blade members of the impeller assembly and subregions to support the blade members will be limited by the length of shaft 30 and the spacing between subregions. The distance between subregions normally will be at least equal to the span of the blade members, and preferably about twice that of the span of the blade members.

Referring to FIGS. 5–7, there are illustrated several representative forms of blade member, in several representative orientations relative to the axis of shaft 30. Thus, FIG. 5 shows a blade portion 36a of flat outline, FIG. 6 shows a blade portion 36b of curved outline, and FIG. 7 shows a blade portion 36c of airfoil outline. The blade portion of flat outline may be located in a vertical orientation or in various pitched orientations, such as at an angle of 45°, while the blade portions of curved and airfoil outline may operate best in the orientation at which they are illustrated in the Figures. Each Figure illustrates arm 38 which extends from the blade portion, a short length of shaft 30 and a flat 44 within the subregion, see also FIG. 4.

The shaft 30 is supported in a journal (not shown) above opening 26. A prime mover (not shown) is connected to the shaft to drive it in one direction of rotation or the other. Rotation of the shaft is represented by arrow 46. Any form of connection of the shaft and prime mover may be employed. Thus, the shaft may include a slot at the proximal end, and the output of the prime mover, in turn, may comprise a collar adapted for receipt around the shaft including a key or rib to be received in the slot. Other means may be resorted to, as well.

The shaft 30 including the length of shaft between subregions 40 and 42, of a first pair as well as other pairs of subregions, may be formed by a cylinder, or the shaft may take the form of a rod. The particular form, aside from considerations of weight, is not important. The subregions 40, 42 which provide a surface for mounting the blade members will be solid in cross section.

In the form of the invention illustrated in the Figures the blade members of impeller assembly 32 may be integrated from the several components by weldments in a manner similar to the manner of formation of the shaft and subregions. Thus, each arm 38 will be connected to a respective blade portion 36, of any form, and, then, coated with a coating which covers the entire surface area of each component. The coating 48 forming a composite may be of vitreous enamel or glass. The coating will be applied for purposes as heretofore discussed. The coating material may be the same as the material used to coat vessel 10 and the coating may be applied in a similar thickness.

Figure 3:
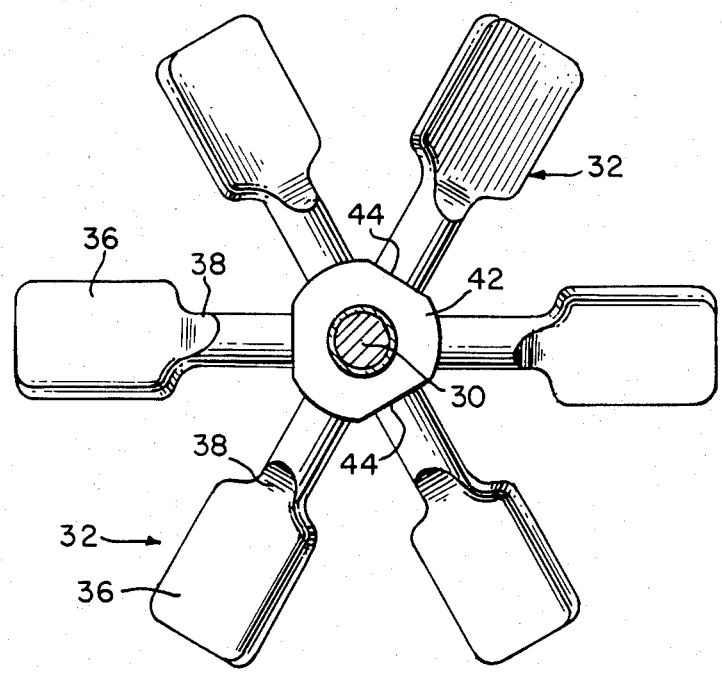
FIG. 3 is a plan view of the impeller assembly of FIG. 2 illustrating one possible angular position of the blade members of the respective tiers of blade members.

FIG. 3 is illustrative of an arrangement of blade members in each of two tiers of blade members, and illustrative of one of several possible number of blade members to be located in each tier. Again, there may be as few as one blade member in a tier and there may be as few as one tier of blade members. Preferably, however, each tier of blade members will include a plurality of blade members with the blade members being arranged equidistantly about the longitudinal axis of shaft 30. A preferred arrangement will include three blade members in each tier. The blade members of one tier may be located between the blade members of an adjacent tier, as in FIG. 3, and the blade members may include blade portions and orientations of blade portions, as previously discussed.

Referring to FIG. 4, there is illustrated in section the subregion 40 including a plurality of bores 50, 52 and 54 extending radially from the surface of the subregion toward the axis. As previously indicated, the subregion is solid in section thereby to provide a surface along each bore, and a surface circumferentially between each bore, for support of a blade member 34. A blade member is illustrated in a disposition exploded out of the bore 50.

The blade members in each tier of blade members extend from the supporting subregion 40 in an attitude to provide the impeller assembly with dynamic stability in operation. Such stability may be provided by an arrangement, such as the arrangement whereby all blade members of the several tiers are located at common circumferential locations, or an arrangement whereby the individual tiers, including different numbers of blade members provide that the blade members are equidistantly located. This discussion is directed to the preferred form of impeller assembly. To this end, as previously discussed, each tier may include only a single blade member.

Each bore 50, 52 and 54 in subregion 40 includes a surface to cooperate with the surface of arm 38 at the distal end. The cooperation of surfaces will create an interference fit. According to one aspect of the invention, the interference fit is created utilizing the principal of cryogenically cooling the tolerance ground cylindrical end of the arm and then introducing the arm into the tolerance ground cylindrical bore, such as bore 50 in the subregion 40. As heat is absorbed by the arm it expands and locks into the bore.

The coolant may be liquid nitrogen, liquified air, or other coolant materials. The arm may be cooled merely by introducing the arm into the coolant. An interference fit of between 0.0001 and 0.0010 inches per inch of diameter may be obtained. This fit will easily provide the resistance required to resist a force acting upon the blade during operation to cause the blade member to rotate about its axis or to cause the blade member to fly out of the bore. If the blade member should become damaged it is necessary to drill a hole in top of the hollow arm of the blade and to pour in a cryogenic coolant such as liquified air. The blade member or arm is then cooled contracting same thereby allowing withdrawal of the arm from the bore in the subregion of the shaft 30. It may be desired to increase the surface area within the hollow arm. This is shown at 56. According to the other form of the invention the arm may essentially duplicate the arm 38, although it may be solid as opposed to the hollow arm which is entered into interference fit. In this form the arm would also have a tolerance ground cylindrical end which would be press fit by mechanical means into a tolerance ground cylindrical bore, such as bore 50 in shaft 30.

The interference fit in both aspects of the invention will assure an adequate self-locking fit to overcome the forces which shall act upon the blade member to induce a turning moment of the blade member about its axis, as well as to cause the blade member to fly out of the bore. This interference fit need not be of the magnitude of the fit required to assure a transmission of torque through an axial joint, as in Nunlist et al '488. Actually, the forces acting upon the joint of the blade member during operation will be significantly less than the force to cause relative rotation between the members in interference fit.

An area of contact of about 19 sq. in. may be provided between each arm 38 and the surface of a bore, such as bore 50. A good interference fit may be provided rather easily between these components. With the above-described construction at ambient conditions, about 400 to 4,000 inch-lbs of torque may be transmitted per square inch of contact area, prior to the joint slipping. If greater torque-transmitting capability is required, it is possible to increase the length of the joint, increase the diameter of the joint, increase the magnitude of interference, or adopt any combination of these changes to affect the required torque transmission. However, the interference fit as described is one that is many times greater than necessary to maintain each blade member in position during operation; and adequately resists disengagement of the blade member from the shaft because of centrifugal force created by rotation of the impeller assembly or the application of torque about the axes of the blade members which may result from unbalanced forces on the blade members. It has been determined that a centrifugal force of about 226 pounds per blade member may be attained during operation, and that an interference fit many times the amount to resist disengagement may be easily obtained.

A clamp set (not shown) may be used both for assembly and disassembly of the members in the first form of the invention. The clamp set may be connected with push-pull mechanisms, such as threaded rods or hydraulic cylinders. The exertion of an axial force on a blade member in the direction of the longitudinal axis of the shaft will result in relative movement between the blade member and shaft to create an interference fit between the blade member and the shaft. A reversal of operation, that is, the generation of a sufficient force in a direction away from the longitudinal axis of the shaft, will release the blade member from the interference fit.

We claim:

1. An agitator for use in stirring, agitating, mixing, and so forth materials such as reactants and reaction products within a vessel comprising:
   (a) a shaft adapted to be supported by said vessel at a proximal end for supporting an impeller assembly within a region extending from the distal end;
   (b) an impeller assembly including
      (1) at least one axial tier of blade members,
      (2) at least one blade member in each tier having a blade portion and an arm extending from said blade portion provided with an outer surface of constant diameter along its length,
      (3) a coating of corrosion resistant material covering the entire surface of each said blade member;
   (c) support means for supporting each blade member in each axial tier of blade members, said support means including a bore in said shaft within said region extending toward the longitudinal axis of said shaft, with each bore having a surface complementary to the surface of said arm whereby said surfaces may be received together telescopically; and
   (d) a coating of a corrosive resistant material covering the surface of said shaft as shall extend within said vessel and the surface along each bore so that when said arm shall extend through said bore an interference fitted connection is created between coated surfaces of said shaft and impeller assembly.

2. The agitator of claim 1 wherein said interference fit is created by forcing said arm into said bore under an assembling force.

3. The agitator of claim 1 wherein the outer diameter of said arm and the inner diameter of said bore are sized to provide an interference fit of about 0.0001 to 0.0010 inches per inch of diameter.

4. The agitator of claims 2 or 3 wherein each bore extends in a radial direction toward the longitudinal axis of said shaft, and wherein each blade member extends substantially radially outward from said shaft.

5. The apparatus of claim 4 wherein said impeller assembly includes a plurality of no more than six blade members arranged at equidistant spacing around said shaft in a first tier of blade members.

6. The apparatus of claim 5 wherein said impeller assembly includes three blade members in said first tier.

7. The apparatus of claim 5 wherein said impeller assembly includes a second tier of blade members and a plurality of no more than six blade members arranged at equidistant spacing around said shaft, and wherein said second tier of blade members is spaced axially from said first tier by a distance at least equal to and no more than about thrice the span of blade members of said first tier.

8. The agitator of claim 7 wherein said axial spacing is substantially equal to about twice the span of blade members of said first tier, and wherein the span of blade members of both tiers is substantially equal. blade members of both tiers is different.

9. The agitator of claim 8 wherein said first and second tiers include an equal number of blade members.

10. The agitator of claim 9 wherein each blade member of said second tier extends from said shaft at an angular disposition which bisects the angular spacing of consecutive blade members of said first tier.

11. The agitator of claim 8 wherein said first and second tiers include an unequal number of blade members.

12. The agitator of claim 11 wherein said first tier includes a greater number of blade members than said second tier.

13. The agitator of claim 11 wherein said second tier includes a greater number of blade members than said first tier.

14. The agitator of claim 7 wherein said axial spacing is substantially equal to about twice the span of blade members of said first tier, and wherein the span of blade members of both tiers is different.

15. The agitator of claim 4 wherein said region extending from the distal end of said shaft includes a subregion which locates each axial tier of blade members, each subregion having a diameter greater than the diameter of an adjacent length of shaft, and said support means located in respective subregions.

16. The agitator of claim 4 wherein said blade portion of each blade member is flat and located in a substantially vertical orientation.

17. The agitator of claim 4 wherein said blade portion of each blade member is flat and located at an angle with respect to the vertical.

18. The agitator of claim 17 wherein the blade portion of each blade member is located at the same angle.

19. The agitator of claim 18 wherein the blade portion of each blade member is located at an angle of 45°.

20. The agitator of claim 4 wherein said blade portion of each blade member is curved and located in a substantially vertical orientation, 21. The agitator of claim 4 wherein each blade portion is airfoil in shape.

22. The agitator of claim 3 wherein said arm between said blade portion and a distal end is hollow, said arm being provided with an internal grooved surface to increase said surface area.

23. The apparatus of claim 2 wherein said interference fit is capable of transmitting at ambient conditions about 400 to 4,000 inch-lbs. of torque per square inch of contact area without slippage at the joint.

24. In combination:
(a) a vessel of the type adapted for receipt of materials to be processed by stirring, mixing, agitating and so forth, including
 (1) an opening through a wall of said vessel, and
 (2) a continuous coating inert to said materials throughout the interior walls of said vessel;
(b) agitator for use in said processing said materials including
 (1) a shaft,
 (2) an impeller assembly located at a distal end of said shaft having
  (i) at least one axial tier of blade members,
  (ii) at least one blade member in each tier, each blade member in each tier having a blade portion and a bar extending from said blade portion provided with an outer surface of constant diameter along its length, and
  (iii) a coating of corrosion resistant material covering the entire surface of each said blade member,
 (3) support means for supporting each blade member in each axial tier of blade members, said support means including a bore in said shaft extending toward the longitudinal axis of said shaft, and each bore having a surface complementary to the surface of said arm whereby said surfaces may be received together telescopically,
 (4) a coating of a corrosive resistant material covering the surface of said shaft as shall extend within said vessel and along each bore in said shaft so that when said arm shall extend through said bore an interference fitted connection is created between coated surfaces of said shaft and impeller assembly; and
(c) means for supporting said shaft at a proximal end within said opening.

25. The combination of claim 24 wherein said interference fit is created by forcing said arm into said bore under an assembling force.

26. The combination of claim 24 wherein the outer diameter of said arm and the inner diameter of said bore are sized to provide an interference fit of about 0.0001 to 0.0010 inches per inch of diameter.

* * * * *

UNITED STATES PATENT AND TRADEMARK OFFICE
CERTIFICATE OF CORRECTION

PATENT NO. : 4,491,421

DATED : January 1, 1985

INVENTOR(S) : Richard Koehl
Michael J. Lerman

It is certified that error appears in the above-identified patent and that said Letters Patent is hereby corrected as shown below:

Column 9, line 29, cancel "blade members of both tiers is different."

Signed and Sealed this

Twentieth Day of August 1985

[SEAL]

Attest:

DONALD J. QUIGG

Attesting Officer     Acting Commissioner of Patents and Trademarks